United States Patent [19]
Matsumoto et al.

[11] Patent Number: 5,831,683
[45] Date of Patent: Nov. 3, 1998

[54] CLOCK SIGNAL GENERATING APPARATUS AND CLOCK SIGNAL GENERATING METHOD

[75] Inventors: Hiroaki Matsumoto, Chiba; Manabu Ukai, Tokyo, both of Japan

[73] Assignee: Sony Corporation, Tokyo, Japan

[21] Appl. No.: 806,915

[22] Filed: Feb. 26, 1997

[30] Foreign Application Priority Data

Feb. 29, 1996 [JP] Japan ..................................... 8-069401

[51] Int. Cl.$^6$ ................................ H04N 5/21; H04N 5/12
[52] U.S. Cl. ............................................ 348/533; 348/537
[58] Field of Search ..................................... 348/533, 536, 348/537, 540, 541, 542, 543, 544, 545, 607; 358/155, 158, 153; H04N 5/21, 5/08, 5/10, 5/12

[56] References Cited

U.S. PATENT DOCUMENTS

| | | | |
|---|---|---|---|
| 3,740,470 | 6/1973 | Rhee | 348/533 |
| 4,496,978 | 1/1985 | Sakamoto et al. | 358/155 |
| 4,707,740 | 11/1987 | Stratton | 348/533 |
| 4,775,890 | 10/1988 | Balaban et al. | 348/540 |
| 4,905,085 | 2/1990 | Faulhaber | 358/148 |
| 5,568,201 | 10/1996 | Matsumoto | 348/540 |
| 5,657,089 | 8/1997 | Onagawa | 348/537 |

*Primary Examiner*—Chris Grant
*Attorney, Agent, or Firm*—Frommer Lawrence & Haug LLP; William S. Frommer; Dennis M. Smid

[57] ABSTRACT

An apparatus and method for generating a clock signal phase-locked to a horizontal synchronization signal of a digital video signal in which noise superposed on the horizontal synchronization signal is eliminated or reduced. To eliminate or reduce such noise, a noise suppressing device located prior to a phase comparator may be utilized. Such noise suppressing block may include a slice circuit and/or a spike removing circuit.

11 Claims, 17 Drawing Sheets

(1)  (2)

MAJORITY DECISION ①

MAJORITY-DECISION
RESULT SIGNAL a

| INPUT | | OUTPUT |
|---|---|---|
| D | EN | Q |
| L | H | L |
| H | H | H |
| Don't Care | L | No Change | m : INTERNAL VARIABLE

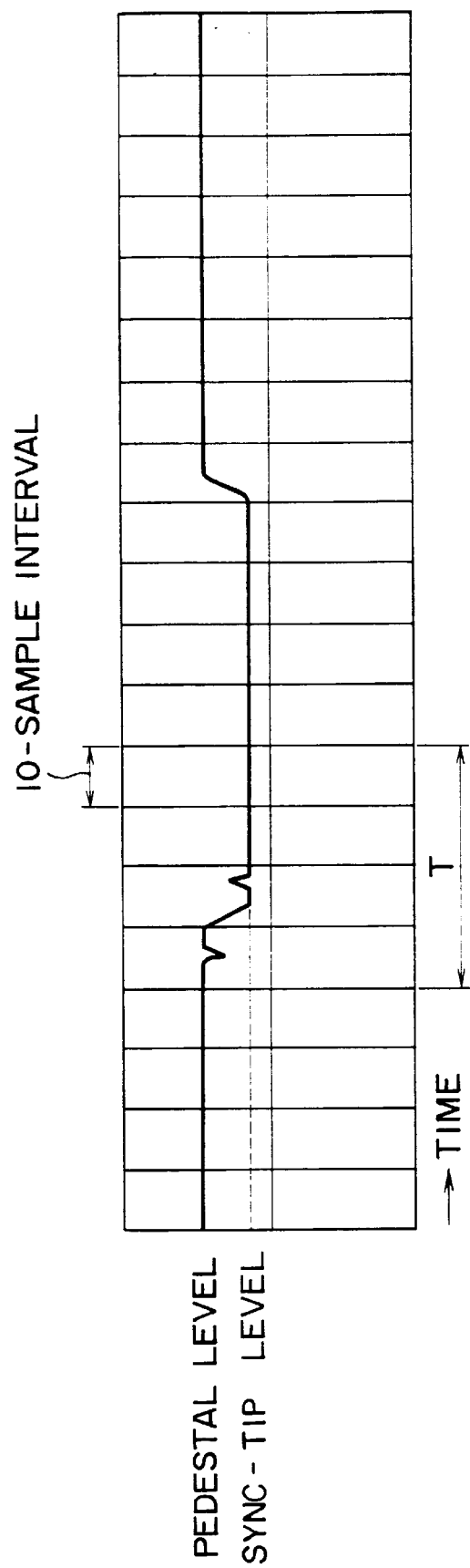

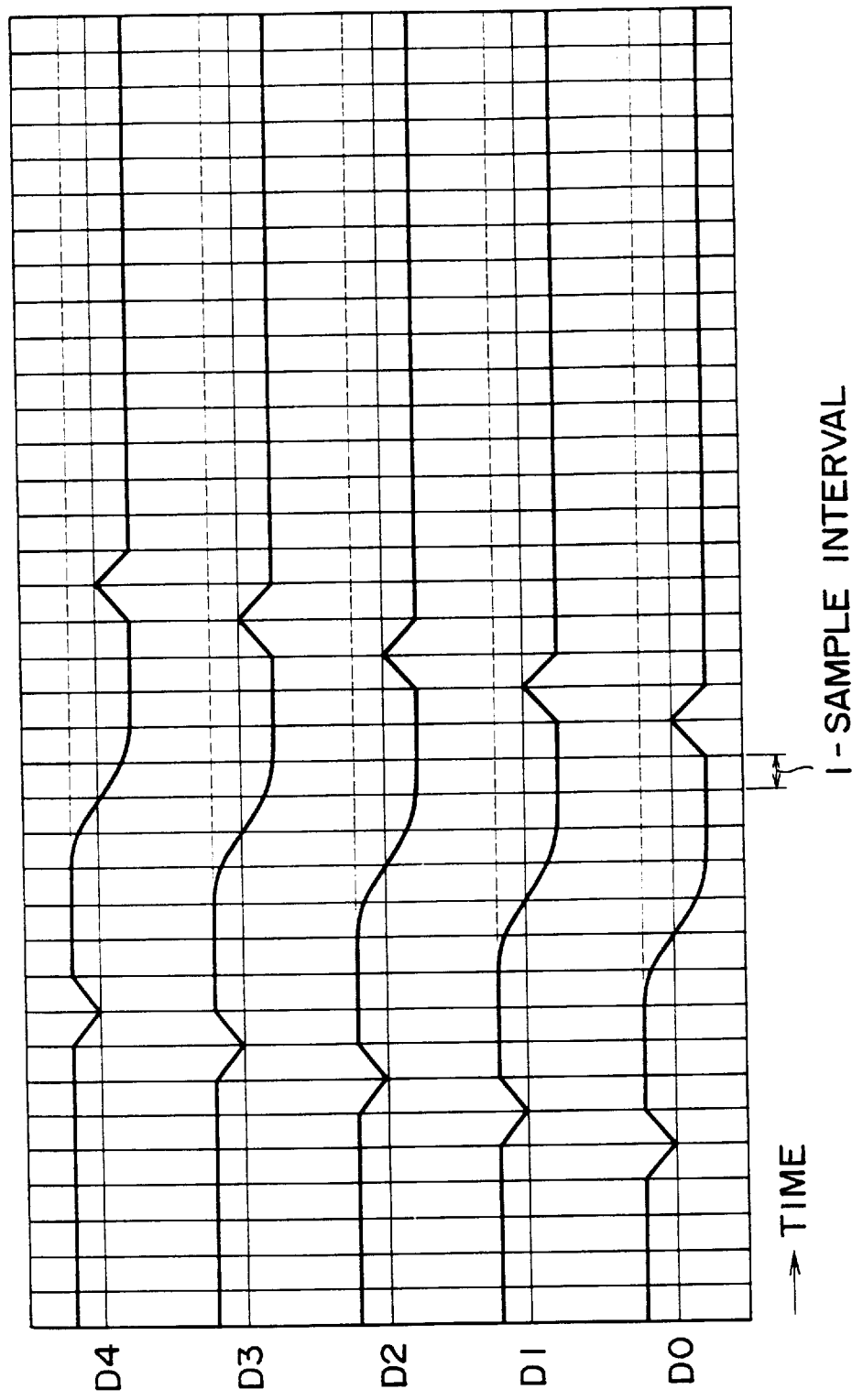

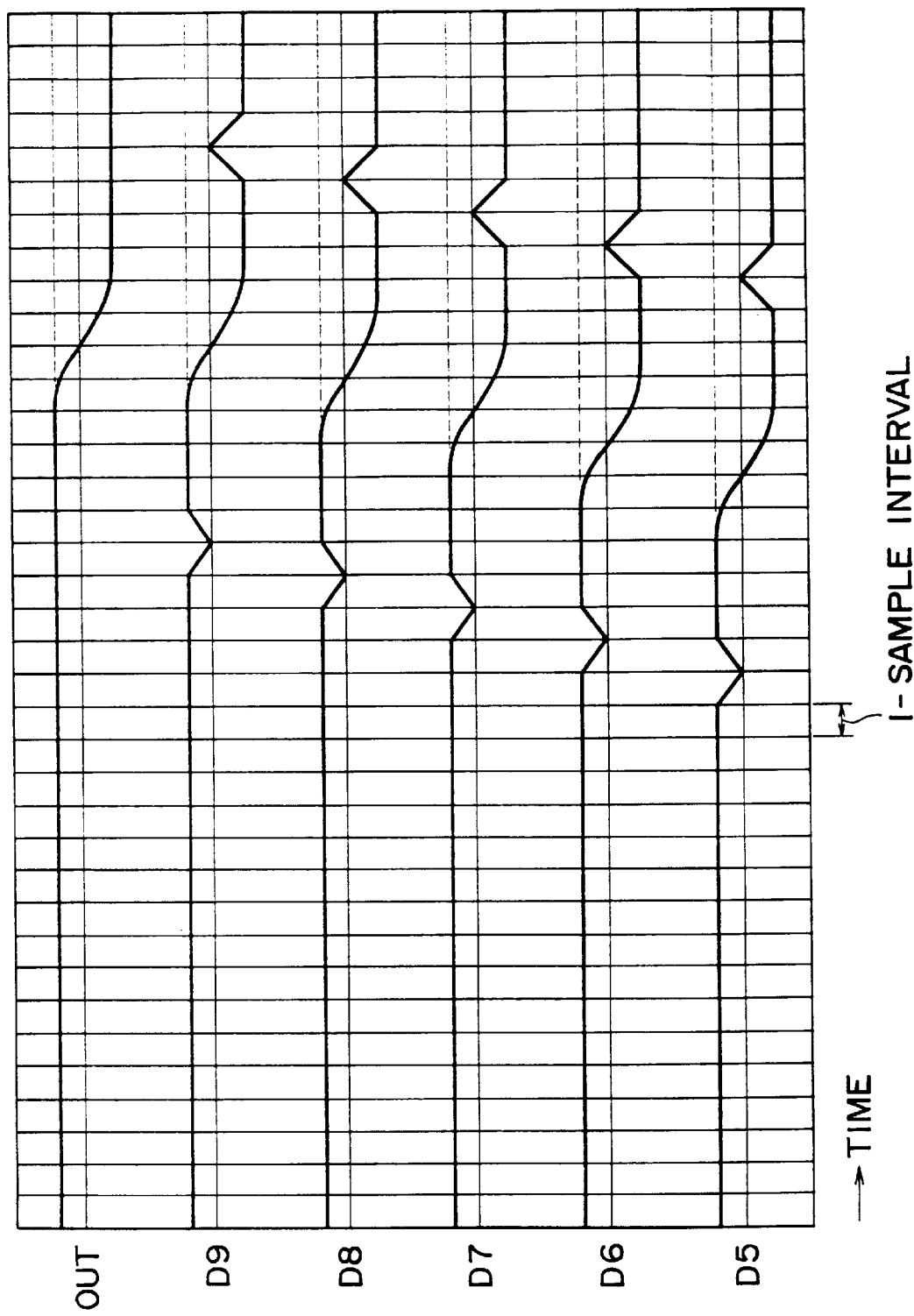

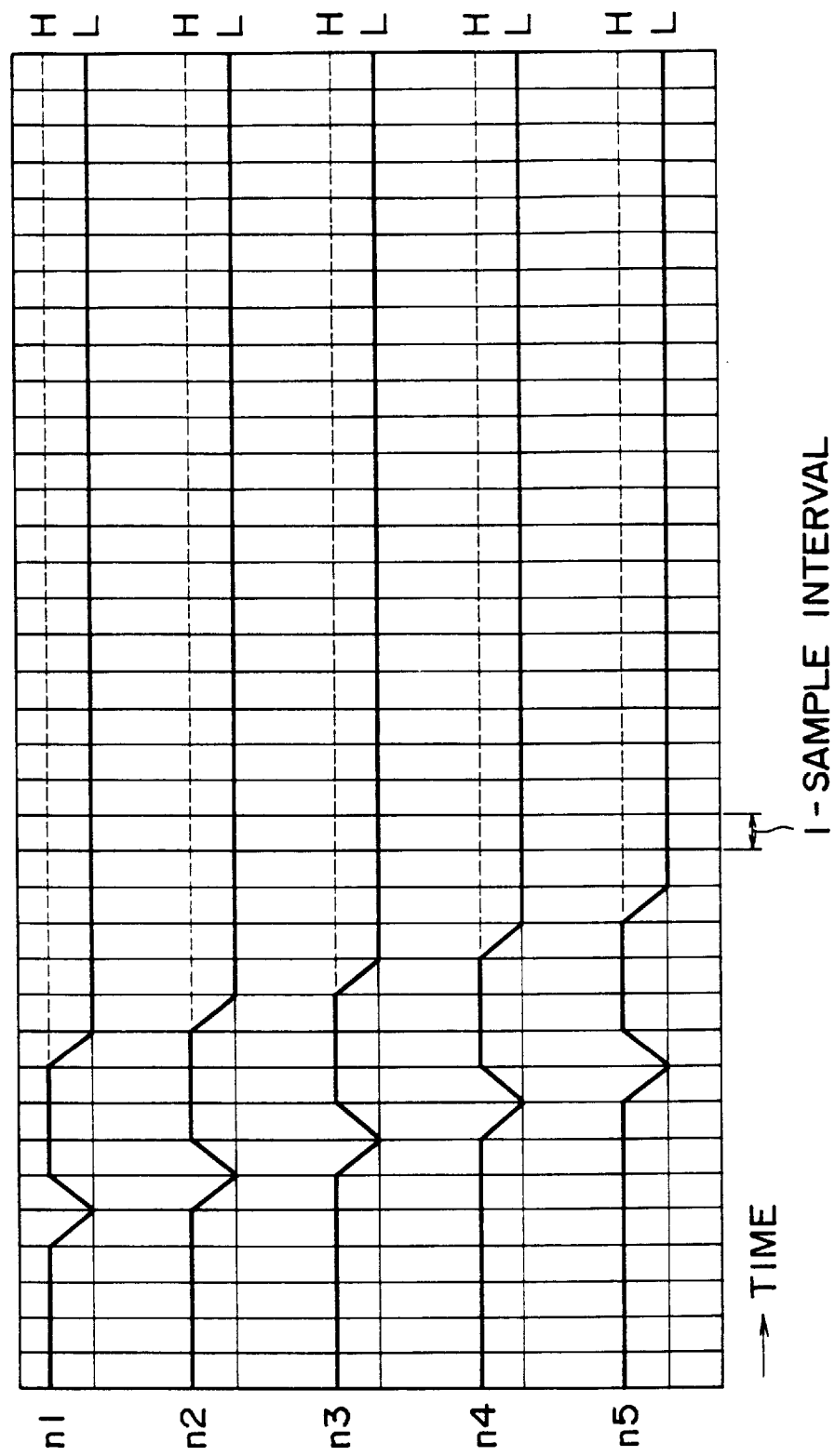

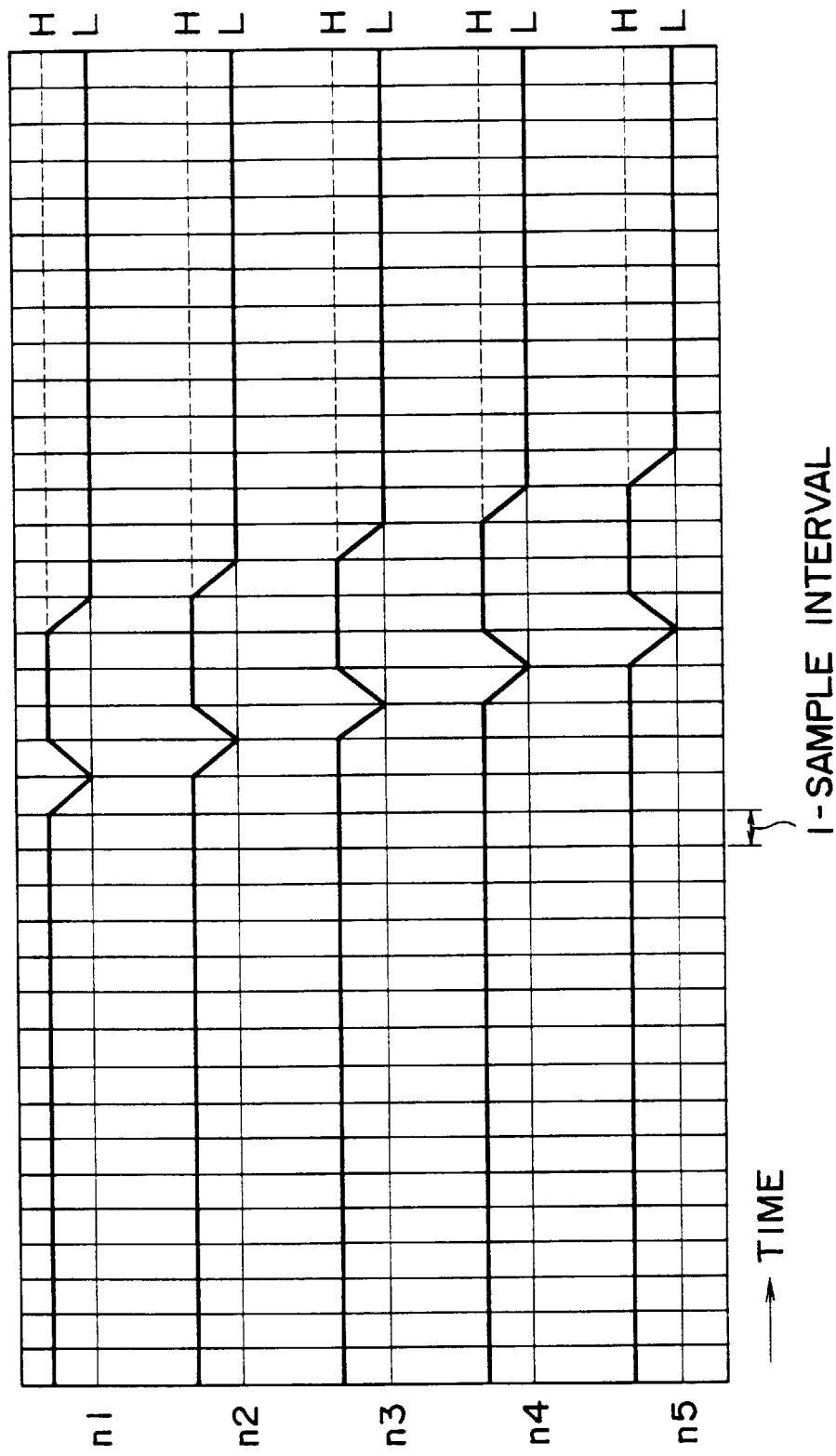

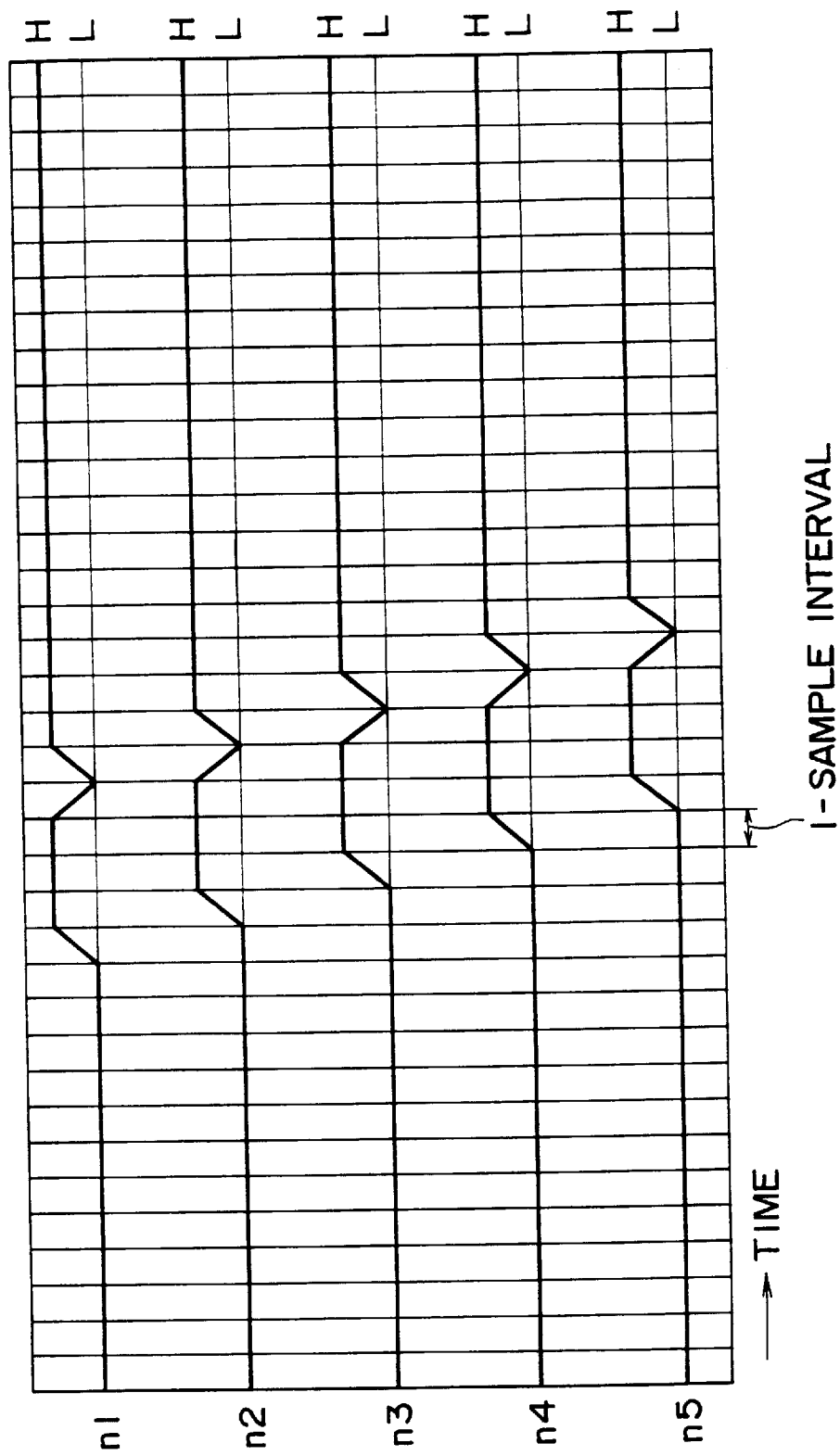

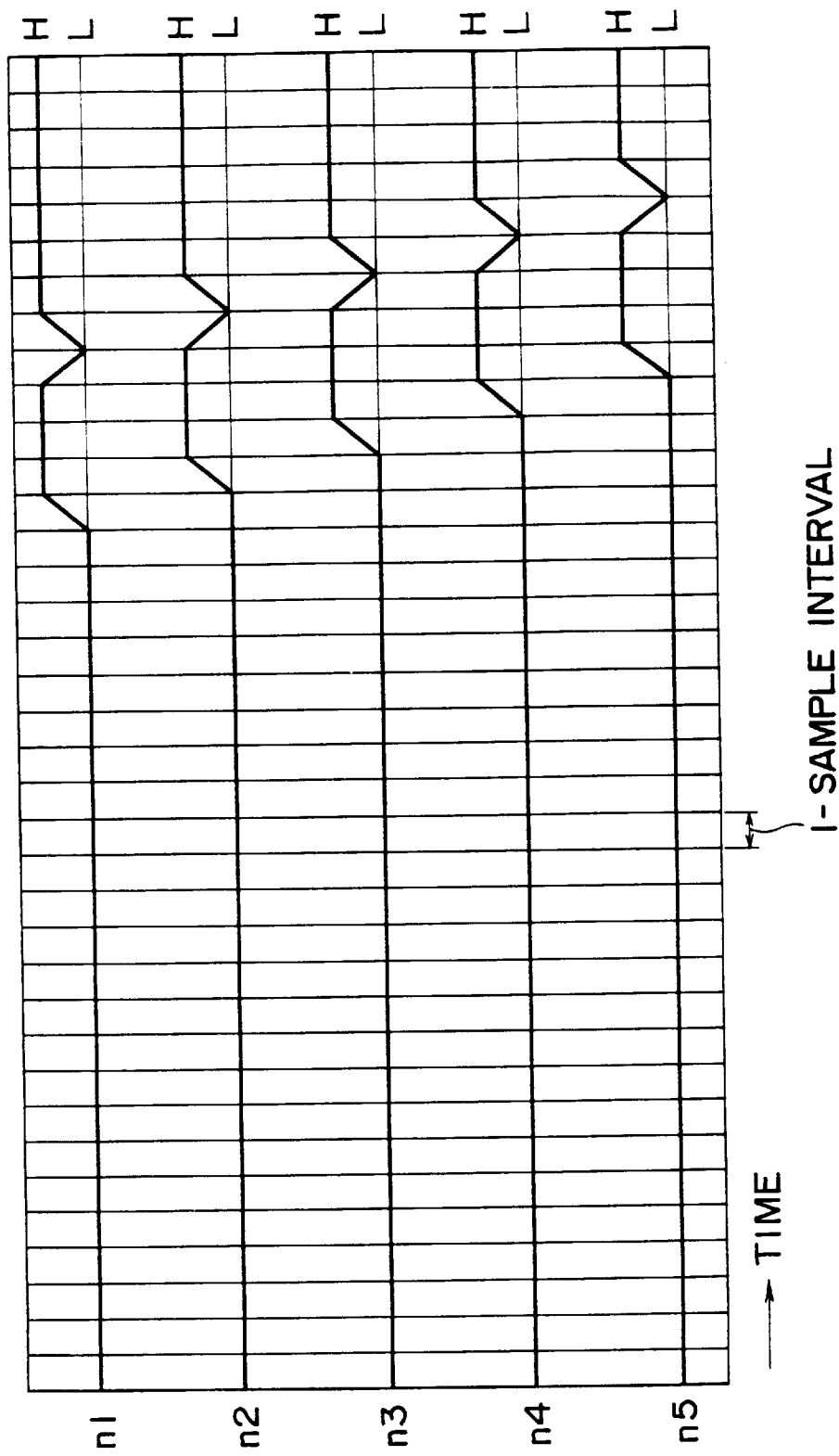

CLOCK SIGNAL GENERATING APPARATUS AND CLOCK SIGNAL GENERATING METHOD

BACKGROUND OF THE INVENTION

1. Field of the Invention

The present invention relates to a clock signal generating apparatus employed in a system for carrying out digital processing of a video signal and a clock signal generating method adopted by the clock signal generating apparatus.

2. Description of Related Art

An apparatus shown in FIG. 20 can be thought of as a clock signal generating apparatus employed in a system for carrying out digital processing of a video signal.

As shown in the figure, the clock signal generating apparatus comprises an A/D converter 1 for converting an analog video signal into a digital video signal, a phase comparator 3 for detecting a phase error by gating the digital video signal output by the A/D converter 1 by means of an integration window to be described later, a voltage-controlled oscillator (also referred to hereafter simply as a VCO) 4 for generating a clock signal CLK with an oscillation frequency controllable by the phase error detected by the phase comparator 3 and a timing signal generator 5 for generating the aforementioned integration window supplied to the phase comparator 3. The clock signal CLK generated by the VCO 4 is supplied to the A/D converter 1, the phase comparator 3 and the timing generator 5 as a system clock.

When the phase error output by the phase comparator 3 is zero, the VCO 4 generates a clock signal with a oscillation frequency 910 times the frequency of a horizontal synchronization signal. Such an oscillation frequency is referred to hereafter as a 910 fH.

The timing signal generator 5 counts the number of pulses of the clock signal generated by the VCO 4. When the pulse count is in a typical range of 0 to 63, an active integration window is generated.

As shown in FIG. 21, the phase comparator 3 comprises a clamp circuit 101 for clamping the digital video signal, a gate circuit 102 for passing on the digital video signal when the integration window is opened (active) and an integrator 103 for integrating a signal output by the gate circuit 102 in order to detect a phase error.

The operation of the phase comparator 3 is explained by referring to FIG. 22. The clamp circuit 101 clamps the digital video signal supplied thereto so that the average of a pedestal level and a sink-chip level of the horizontal synchronization signal included in the digital video signal is at a zero potential. As described above, the gate circuit 102 passes on the digital video signal supplied thereto when the integration window is opened. The integrator 103 integrates data passing through the gate circuit 102. Also as described above, when the pulse count of the clock signal generated by the VCO 4 is in a typical range of 0 to 63, the integration window is made active. As a result, with the integration window opened, typically, 64 samples of data are passed on by the gate circuit 102. At that time, the number of samples on the rising edge of the horizontal synchronization signal and the number of samples on the rising edge of the horizontal synchronization signal are both set at 2.

At that time, if the phase of the integration window is locked correctly to the phase of the horizontal synchronization signal, the area of a region A is equal to the area of a region B. Since the region A represents the number of sample values below the zero level while the region B represents the number of sample values above the zero level, the result of the integration is zero. If the area of the region A is smaller than the area of the region B, the phase of the integration window is leading, giving a positive integration result. If the area of the region A is greater than the area of the region B, on the other hand, the phase of the integration window is lagging, giving a negative integration result. The absolute value of the integration result indicates the magnitude of the phase shift whereas the sign of the integration result indicates the direction of the phase shift. The phase error represented by this phase shift is used for controlling the frequency of the VCO 4 and locking the phase of the integration window with the phase of the horizontal synchronization signal.

FIG. 22 is a diagram showing an ideal waveform of the horizontal synchronization signal included in a digital video signal. In actuality, however, the horizontal synchronization signal includes noise superposed thereon. With noise superposed on the horizontal synchronization signal, a signal output by the integrator does not represent the phase shift correctly.

SUMMARY OF THE INVENTION

The present invention addresses the problem described above. It is thus an object of the present invention to provide a means for removing noise superposed on the horizontal synchronization signal of the digital video signal supplied to the phase comparator.

In order to solve the problems described above, the present invention provides a clock signal generating apparatus for generating a clock signal with the phase thereof locked to the phase of a horizontal synchronization signal of a digitized video signal, said clock signal generating apparatus comprising:

(a) a noise slicing means for slicing noise superposed on said horizontal synchronization signal of said digitized video signal;

(b) a phase comparing means for comparing the phase of a signal output by said noise slicing means with the phase of a comparison signal generated internally in order to detect a phase error;

(c) a clock signal generating means for generating a signal with a variable oscillation frequency thereof controllable in accordance with a signal output by said phase comparing means to represent said phase error; and (d) a means for generating said comparison signal by counting the number of pulses of said signal generating by said clock signal generating means.

In place of the noise slicing means for slicing noise superposed on said horizontal synchronization signal of said digitized video signal, a logical filter can be used for removing spike noise superposed on said horizontal synchronization signal of said digitized video signal. As an alternative, both a noise slicing means and a logical filter can be used.

In addition, the present invention provides a method for generating a clock signal with the phase thereof locked to the phase of a horizontal synchronization signal of a digitized video signal, said method comprising the steps of:

detecting a phase error between a digitized signal of said video signal and a comparison signal generated internally; and controlling the oscillation frequency of said clock signal in accordance with said phase error, wherein said phase error is detected after noise superposed on said horizontal synchronization signal of said digitized video signal has been sliced.

In place of the step of slicing noise superposed on the horizontal synchronization signal of the digitized video signal, a step of removing spike noise superposed on the horizontal synchronization signal of the digitized video signal by means of a logical filter can be executed. As an alternative, after noise superposed on the horizontal synchronization signal of the digitized video signal has been sliced, spike noise superposed on the horizontal synchronization signal of the digitized video signal can be removed by means of a logical filter.

According to the present invention, noise superposed on the horizontal synchronization signal of the digitized video signal is sliced. On the top of that, spike noise superposed on the horizontal synchronization signal of the digitized video signal is removed by means of a logical filter.

BRIEF DESCRIPTION OF THE DRAWINGS

The above and other objects, features as well as many of attendant advantages of the present invention will become apparent from the following detailed description when considered with reference to the accompanying figures wherein:

FIG. 10 is a diagram showing a typical input signal supplied to the spike removing block;

FIG. 12 is a diagram showing signal waveforms appearing at elements composing a four-sample delay circuit 31;

FIG. 13 is a diagram showing signal waveforms appearing at elements composing a four-sample delay circuit 33;

FIG. 14 is a diagram showing the waveforms of input signals supplied to a first major decision judgment unit;

FIG. 15 is a diagram showing the waveforms of input signals supplied to a second major decision judgment unit;

FIG. 16 is a diagram showing the waveforms of input signals supplied to a third major decision judgment unit;

FIG. 17 is a diagram showing the waveforms of input signals supplied to a fourth major decision judgment unit;

DETAILED DESCRIPTION OF THE PREFERRED EMBODIMENTS

The present invention will become more apparent from the following detailed description of some preferred embodiments with reference to the accompanying diagrams showing the embodiments.

Figure 1:
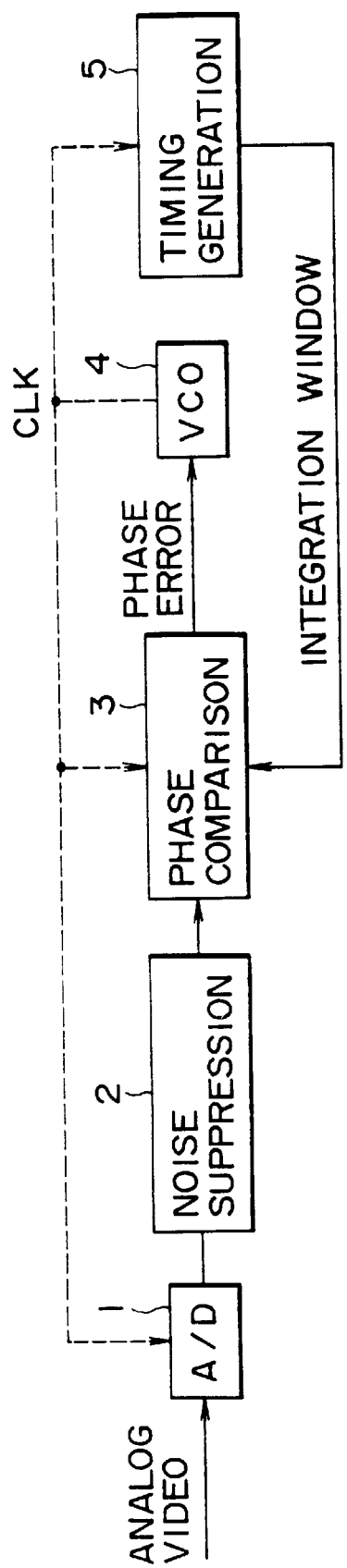
FIG. 1 is a block diagram showing the configuration of a clock signal generating apparatus to which the present invention is applied.
Figure 20:
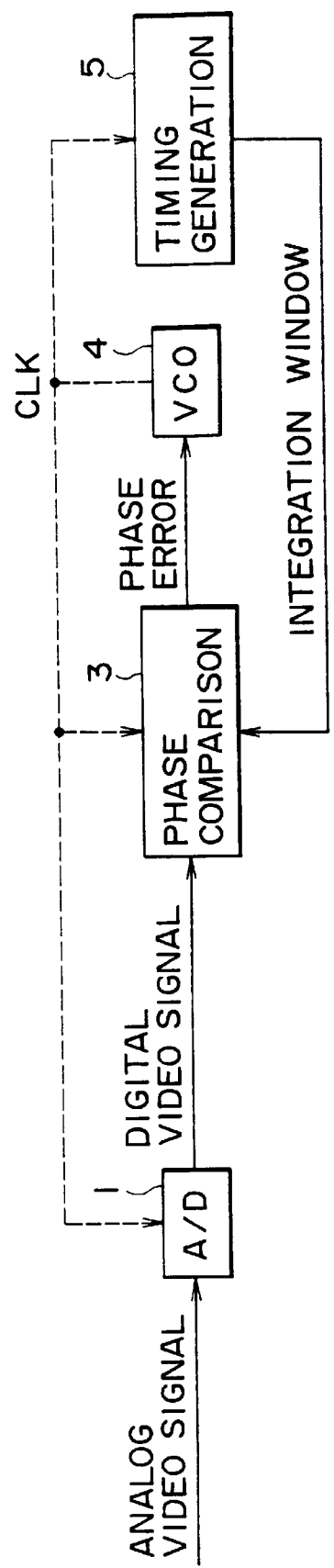
FIG. 20 is a block diagram showing the configuration of a conventional clock signal generating apparatus.
Figure 21:
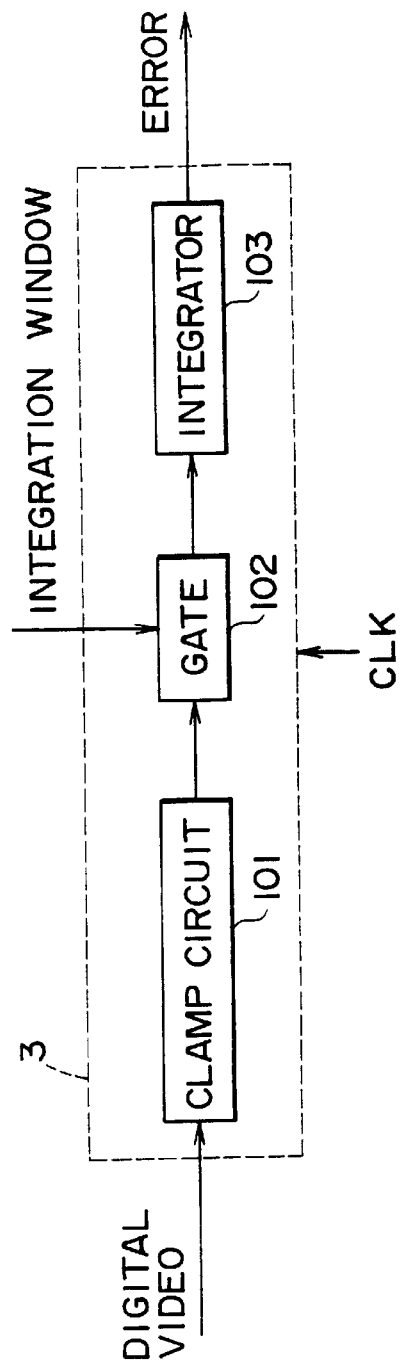
FIG. 21 is a block diagram showing the configuration of a phase comparator employed in the conventional clock signal generating apparatus shown in FIG. 20.
Figure 22:
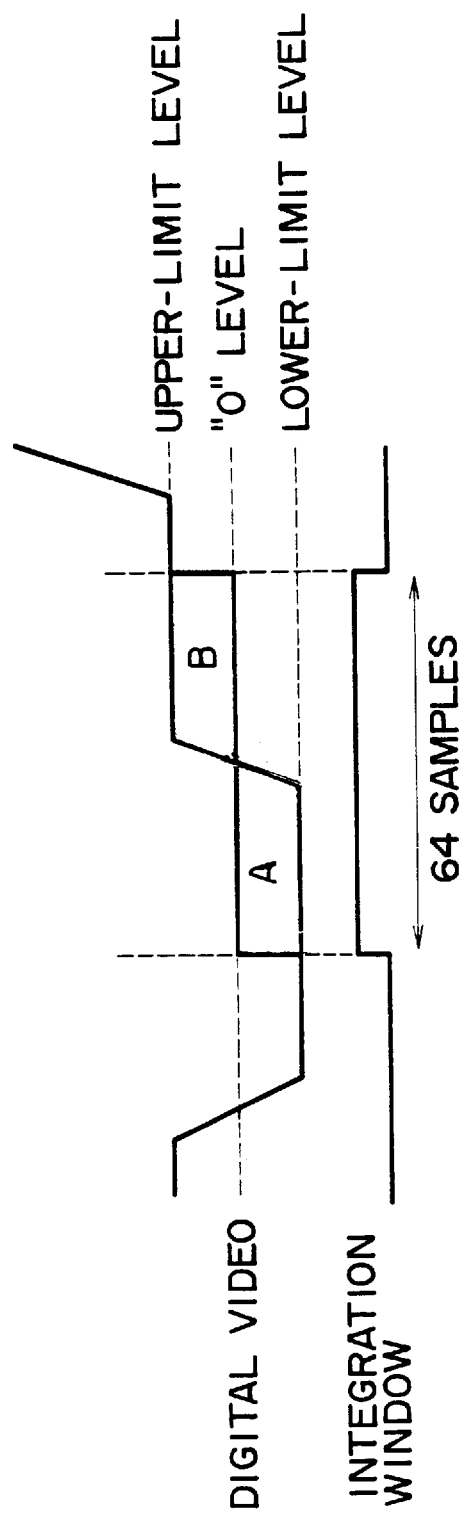
FIG. 22 is an explanatory diagram used for describing the operation of the phase comparator shown in FIG. 21.

FIG. 1 is a block diagram showing the configuration of a clock signal generating apparatus to which the present invention is applied. Components identical with components shown in FIG. 20 are each denoted by the same reference numeral as that used for denoting the identical component shown in FIG. 20.

As shown in FIG. 1, the clock signal generating apparatus comprises an A/D converter 1 for converting an analog video signal into a digital video signal, a noise suppressing block 2 for suppressing noise in the digital video signal output by the A/D converter 1, a phase comparator 3 for detecting a phase error by gating a signal output by the noise suppressing block 2 by means of an integration window to be described later in order to detect a phase error, a VCO 4 for generating a clock signal CLK with an oscillation frequency controllable by the phase error detected by the phase comparator 3 and a timing signal generator 5 for generating the aforementioned integration window supplied to the phase comparator 3. As described above, the clock signal generating apparatus provided by the present invention is the same as the conventional clock signal generating apparatus except that the former is obtained by adding the noise suppressing block 2 to the latter at the input of the phase comparator 3.

Figure 2:
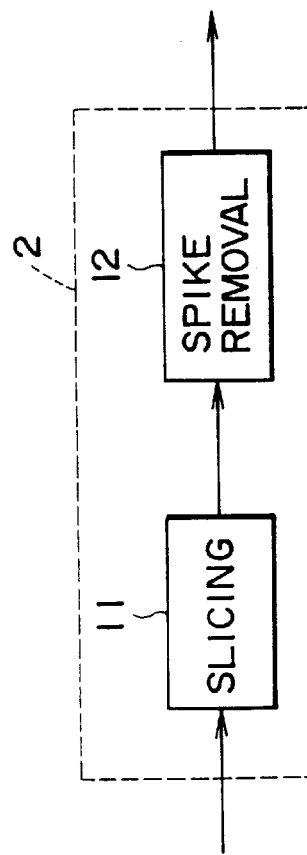
FIG. 2 is a block diagram showing the configuration of a noise suppressing block.

As shown in FIG. 2, the noise suppressing block 2 comprises a slice block 11 and a spike removing block 12. The slice block 11 is used for removing small noise superposed on the sync-tip and the pedestal of the horizontal synchronization signal. On the other hand, the spike removing block 12 eliminates large noise that can not be removed by the slice block 11.

Figure 3:
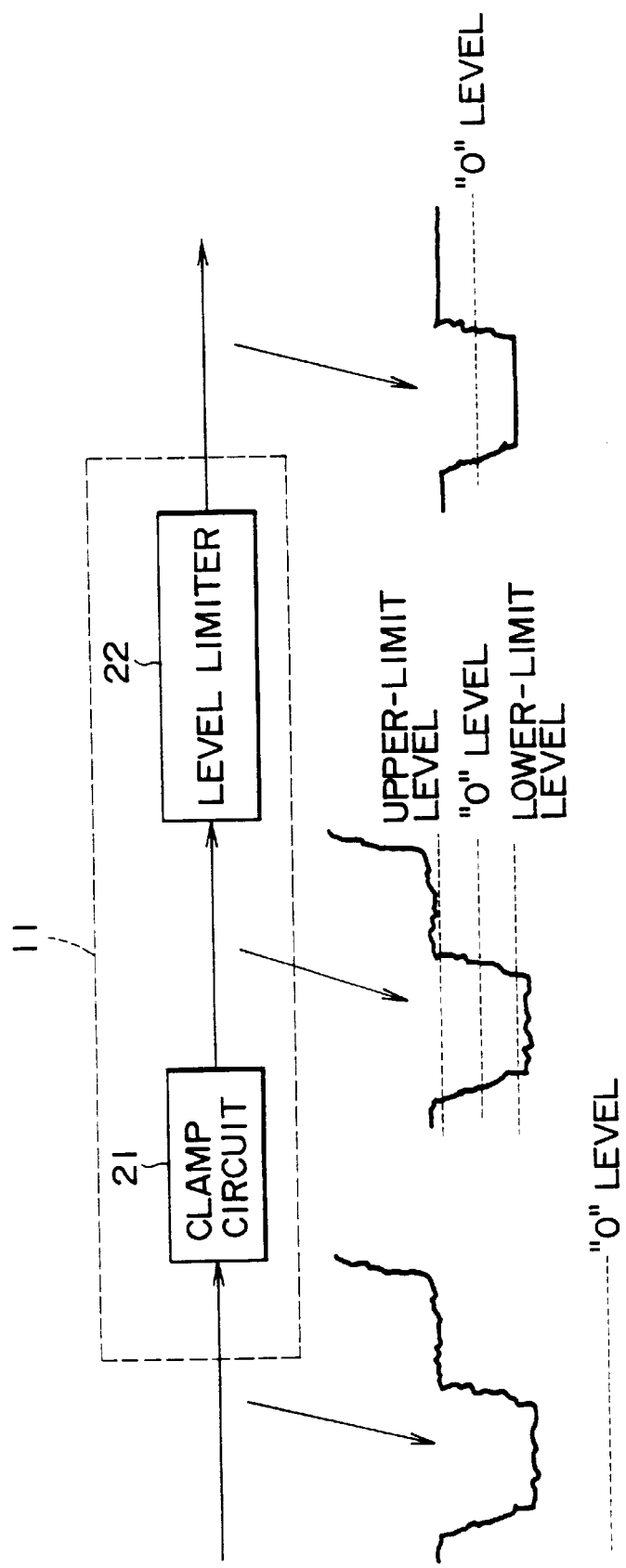
FIG. 3 is a block diagram showing the configuration of a slice block.

As shown in FIG. 3, the slice block 11 comprises a clamp circuit 21 and a level limiter 22. The clamp circuit 21 is used for clamping a digital video signal supplied thereto so that the average of the pedestal and sink-chip levels coincides with the zero level. On the other hand, the level limiter 22 limits the upper and lower levels of the digital video signal clamped by the clamp circuit 21. At that time, the limit level on the upper side (referred to hereafter as an upper limit level) is set below the pedestal level. On the other hand, the limit level on the lower side (referred to hereafter as a lower limit level) is set above the sync-tip level. In this way, since small noise superposed on the sync-tip and the pedestal of the horizontal synchronization signal is removed, most of the noise which affects an integration result produced by the phase comparator is eliminated.

Figure 4:
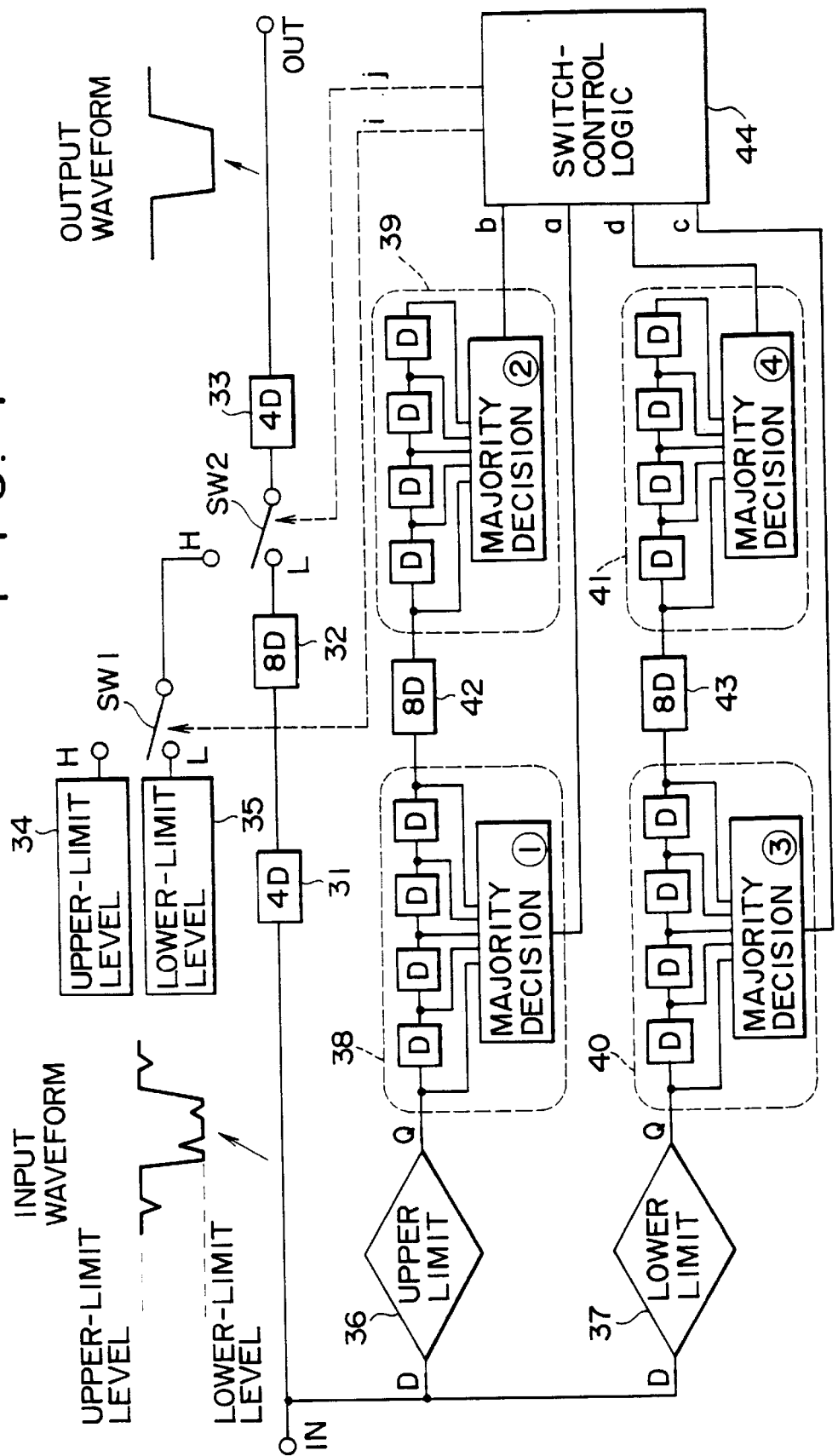
FIG. 4 is a block diagram showing the configuration of a spike removing block.

As shown in FIG. 4, the spike removing block 12 is implemented by a logical filter comprising a four-sample delay circuit 31, an eight-sample delay circuit 32 and another four-sample delay circuit 33 which are connected to each other to form a cascade arrangement along the transmission line of the digital video signal.

In addition, the spike removing block 12 also includes an upper-limit level generating circuit 34, a lower-limit level generating circuit 35, a first switch SW1 for selecting either a signal output by the upper-limit level generating circuit 34 or a signal output by the lower-limit level generating circuit 35 and a second switch SW2 for selecting either a signal output by the 8-sample delay circuit 32 or a signal selected by the first switch SW1. A switch-control logic circuit 44 employed in the spike removing block 12 is used for switching the first and second switches SW1 and SW2 so as to produce an output waveform which excludes noise from the input waveform including large spike noise.

Next, the switch-control logic circuit 44 is explained. The switch-control logic circuit 44 generates a switch-control signal i for controlling the switching of the first switch SW1 and a switch-control signal j for controlling the switching of the second switch SW2. The control signals i and j are generated by predetermined logic using majority decision judgment signals a, b, c and d output by first, second, third and fourth majority decision judgment units 38, 39, 40 and 41 respectively which are also employed in the switch-control logic circuit 44.

Figure 5:
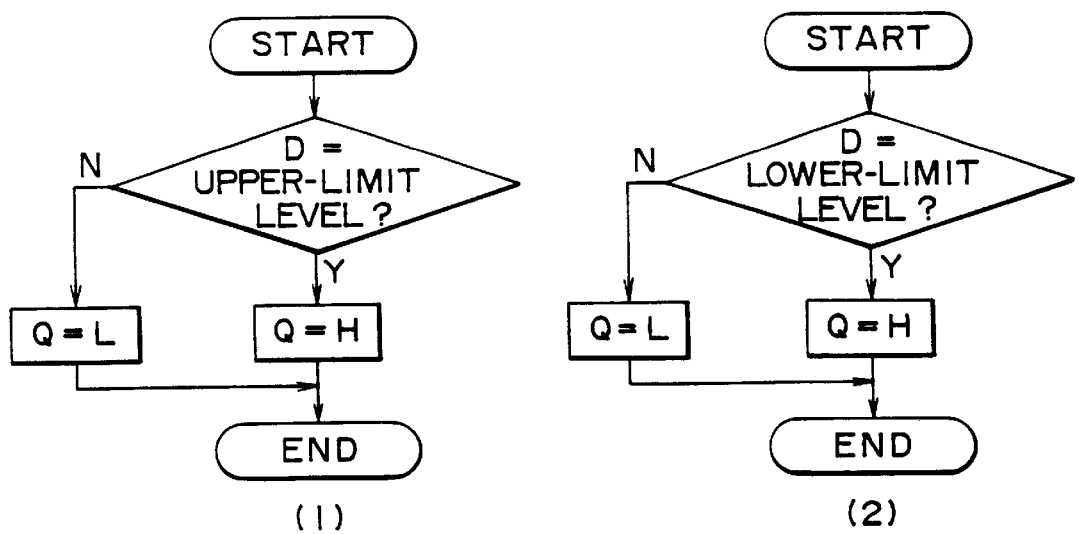
FIG. 5 is a flowchart showing processings carried out by an upper-limit level judging unit and a lower-limit level judging unit.

The first majority decision judgment unit 38 has an upper-limit level judging unit 36 provided at the input thereof. On the other hand, the third majority decision judgment unit 40 has an lower-limit level judging unit 37 provided at the input thereof. As shown in a diagram (1) of FIG. 5, the upper-limit level judging unit 36 is used for determining whether or not the level of input data is equal to the upper limit. If the level of input data is found equal to the upper limit, the upper-limit level judging unit 36 outputs an H (high) logic signal. If the level of input data is found not equal to the upper limit, on the other hand, the upper-limit level judging unit 36 outputs an L (low) logic signal. By the same token, as shown in a diagram (2) of FIG. 5, the lower-limit level judging unit 37 is used for determining whether or not the level of input data is equal to the lower limit. If the level of input data is found equal to the lower limit, the lower-limit level judging unit 37 outputs an H (high) logic signal. If the level of input data is found not equal to the lower limit, on the other hand, the lower-limit level judging unit 37 outputs an L (low) logic signal.

Each of the first, second, third and fourth majority decision judgment units 38, 39, 40 and 41 comprises four one-sample delay circuits which are connected to each other to form a cascade arrangement and a majority decision circuit (1), (2), (3) or (4) for comparing five consecutive samples appearing at the inputs and/or outputs of the four one-sample delay circuits.

Figure 6:
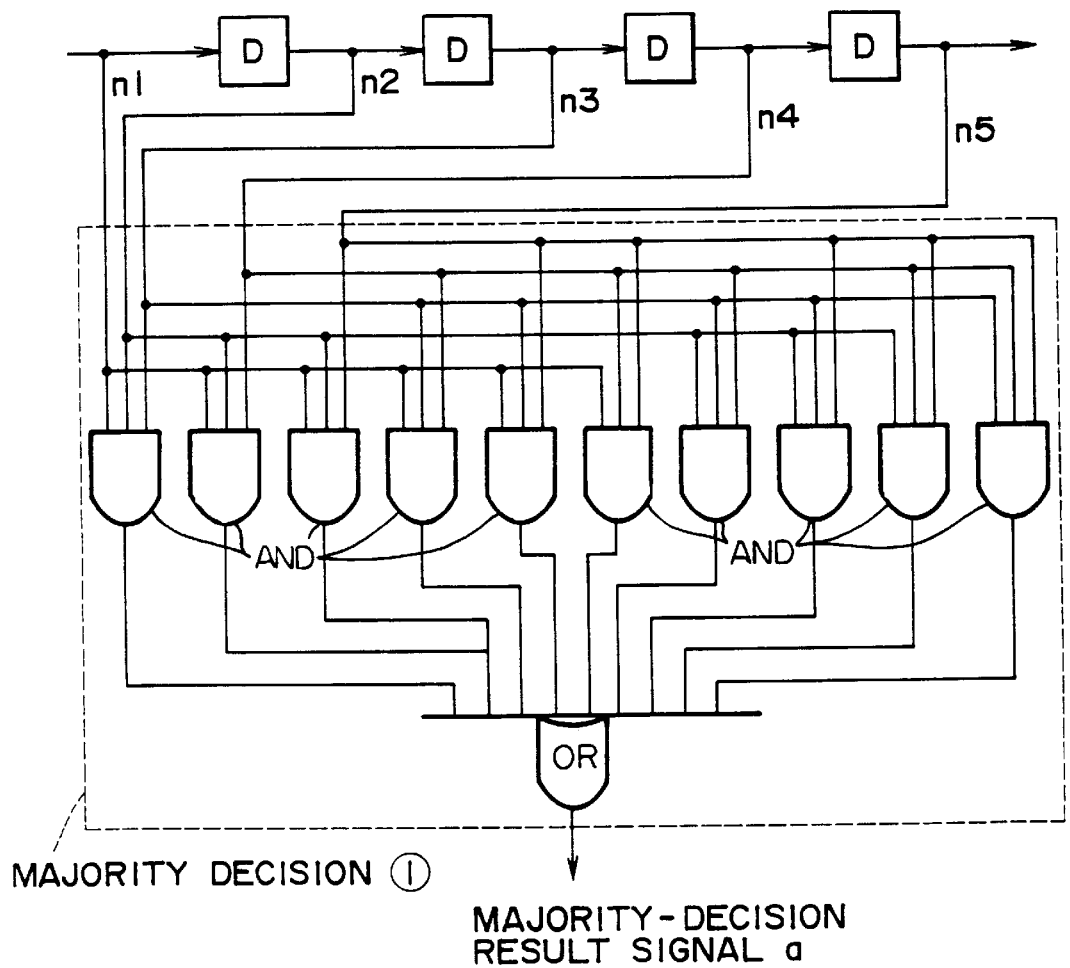
FIG. 6 is a block diagram showing the actual configuration of a first major decision judgment unit.

FIG. 6 is a diagram showing the configuration of the first majority decision judgment unit 38. As shown in the figure, the first majority decision judgment unit 38 inputs the five consecutive samples n1, n2, n3, n4 and n5 as levels for outputting a judgment result signal a. If three or more samples are "H", the judgment result signal a is "H". Otherwise, the judgment result signal a is "L". As shown in FIG. 4, an output n5 of the first majority decision judgment unit 38 is supplied to the second majority decision judgment unit 39 by way of an eight-sample delay circuit 42. Much like the first majority decision judgment unit 38, the configuration of the second majority decision judgment unit 39 is like the one shown in FIG. 6. By the same token, the second majority decision judgment unit 39 inputs the five consecutive samples n1, n2, n3, n4 and n5 as levels for outputting a judgment result signal b. If three or more samples are "H", the judgment result signal b is "H". Otherwise, the judgment result signal b is "L". The judgment result signal a output by the first majority decision judgment unit 38 and the judgment result signal b output by the second majority decision judgment unit 39 are supplied to the switch-control logic circuit 44.

Much like the first majority decision judgment unit 38, the configuration of the third majority decision judgment unit 40 is like the one shown in FIG. 6. Similarly, the third majority decision judgment unit 40 inputs the five consecutive samples n1, n2, n3, n4 and n5 as levels for outputting a judgment result signal c. If three or more samples are "H", the judgment result signal c is "H". Otherwise, the judgment result signal c is "L". Much like the first majority decision judgment unit 38, the configuration of the fourth majority decision judgment unit 41 is like the one shown in FIG. 6. Likewise, the fourth majority decision judgment unit 41 inputs the five consecutive samples n1, n2, n3, n4 and n5 as levels for outputting a judgment result signal d. If three or more samples are "H", the judgment result signal d is "H". Otherwise, the judgment result signal d is "L". The judgment result signal c output by the third majority decision judgment unit 40 and the judgment result signal d output by the fourth majority decision judgment unit 41 are also supplied to the switch-control logic circuit 44.

Figures 7, 8:
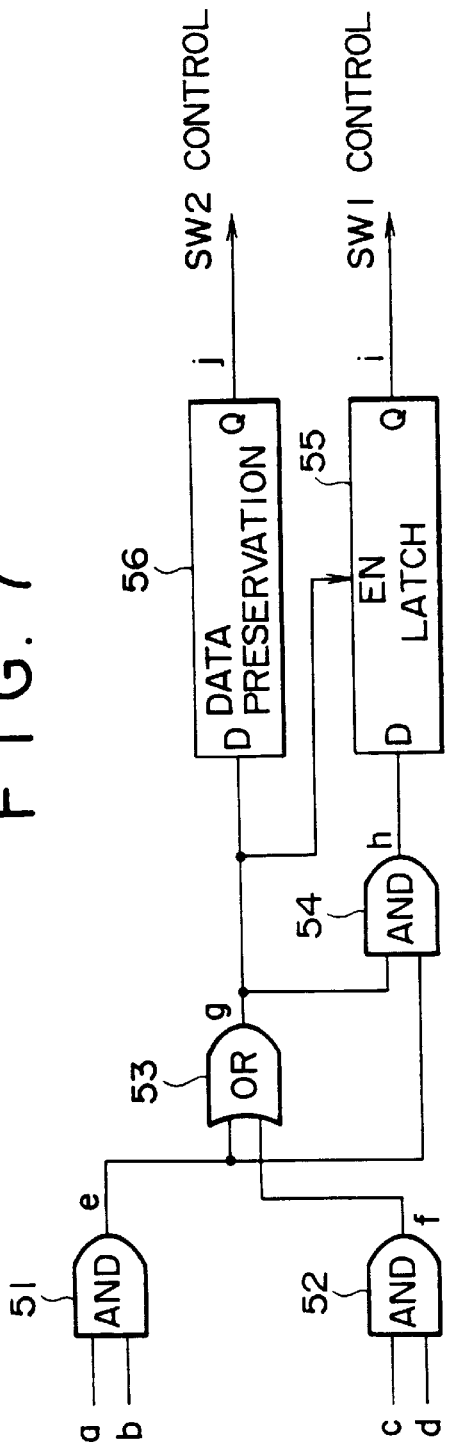
FIG. 7 is a block diagram showing the actual configuration of a switch-control logic circuit.
FIG. 8 is a diagram showing the operation of a latch circuit.

As shown in FIG. 7, the switch control logic circuit 44 comprises:

an AND gate 51 for generating an AND output signal e representing the logical product of the judgment result signals a and b;

an AND gate 52 for generating an AND output signal f representing the logical product of the judgment result signals c and d;

an OR gate 53 for generating an OR output signal g representing the logical sum of the AND output signals e and f;

an AND gate 54 for generating an AND output signal h representing the logical product of the AND output signal e and the OR output signal g;

a latch circuit 55 for generating the switch-control signal i for controlling the first switch SW1 by using the AND output signal h and the OR output signal g; and a data preserving circuit 56 for generating the switch-control signal j for controlling the second switch SW2 by using the OR output signal g.

As shown in FIG. 8, the latch circuit 55 inputs the AND output signal h from the AND gate 54 as a data (D) signal and the OR output signal g from the OR gate 53 as an enable (EN) signal. When the enable signal EN is "H", the data signal is delayed by one sample before being output as an output (Q) signal having the same level as the data signal. When the enable signal EN is "L", on the other hand, the level of the output signal is not changed.

Figure 9:
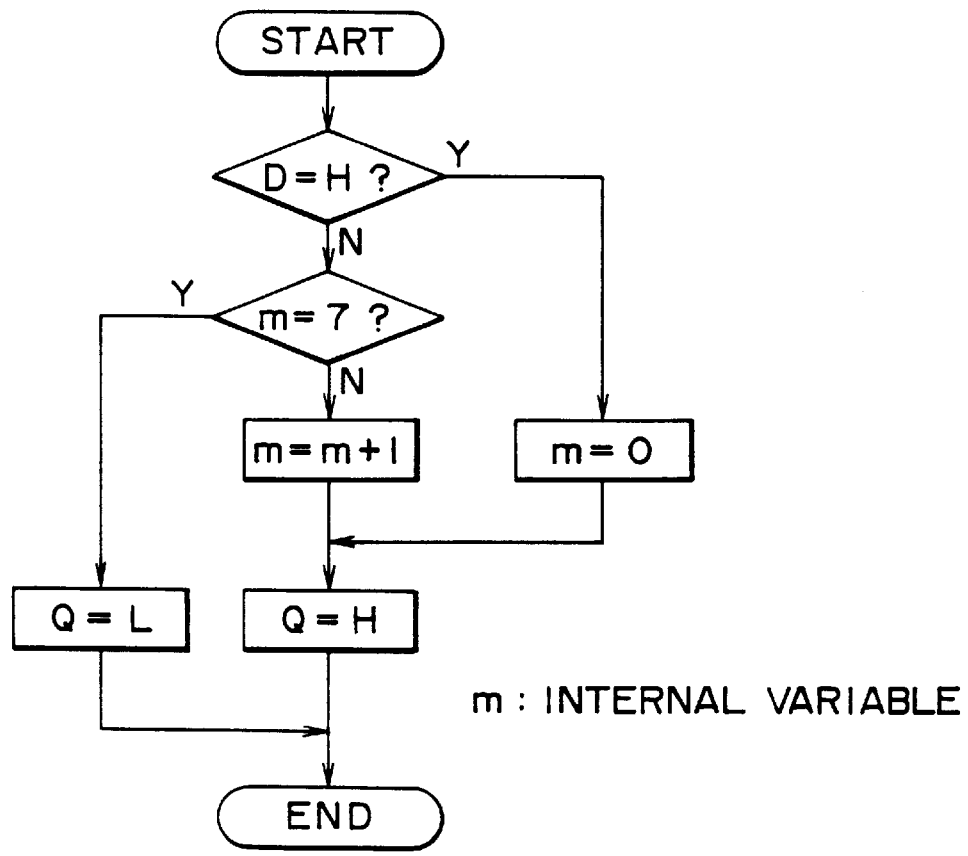
FIG. 9 is a flowchart showing the operation of a data preserving circuit.

As shown in FIG. 9, with the level of the input (D) signal set to "H", the data preserving circuit 56 sets an internal variable m to zero and sets the level of an output (Q) signal to "H". With the level of the input signal set to "L", on the other hand, if the internal variable m is in the range 0 to 6, the data preserving circuit 56 increments the internal variable m by one and then sets the level of the output signal to "H". If the internal variable m is 7, however, the data preserving circuit 56 resets the level of the output signal to "L".

That is to say, when the judgment result signals a and b are both "H", it is quite within the bounds of possibility that the levels of seven samples inside the eight-sample delay circuit 32 are naturally the level of the upper limit. In this case, the first and second switches SW1 and SW2 are both connected to H pins thereof in order to replace all the seven samples by a signal output by the upper-limit level generating circuit 34 which is then supplied to the four-sample delay circuit 33 provided at the later stage. When the judgment result signals a and b are not both "H", on the other hand, the seven samples are supplied to the four-sample delay circuit 33 provided at the later stage as they are.

By the same token, when the judgment result signals c and d are both "H", it is quite within the bounds of possibility that the levels of seven samples inside the eight-sample delay circuit 32 are naturally the level of the lower limit. In this case, the first and second switches SW1 is connected to an L pin thereof while the second switch SW2 is connected to its H pin in order to replace all the seven samples by a signal output by the lower-limit level generating circuit 35 which is then supplied to the four-sample delay circuit 33 provided at the later stage. When the judgment result signals c and d are not both "H", on the other hand, the seven samples are supplied to the four-sample delay circuit 33 provided at the later stage as they are.

A plurality of time windows are provided within a predetermined time slot. For each of the time windows, the existence/nonexistence of noise is determined on a majority decision basis. When judgment results for the time windows are sustained in a predetermined state and for a predetermined time, the data replacement described above is carried out. In this way, spike noise (that is, noise with a high level but a small width) and burst signals which can not be eliminated by the slice block can be masked out. In addition, even in the case of a poor S/N ratio of a signal such as a case caused by a weak electrical field, the locking operation is stable. On the top of that, since the judgment of the data replacement is made by checking the preceding and succeeding data, the edges of the synchronization signal waveform are never masked.

Next, the operations of elements constituting the spike removing block shown in FIG. 4 are explained through actual signal waveforms thereof. Let a signal with spike noises existing before and after the trailing edge of the horizontal synchronization signal as shown in FIG. 10 be input. The waveforms appearing at various elements during a time period T are explained. In this figure, one scale of the horizontal axis corresponds to ten samples.

Figure 11:
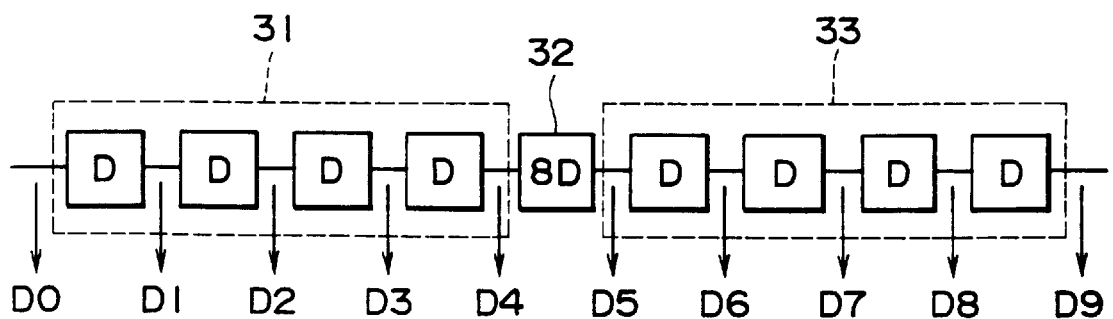
FIG. 11 is a block diagram showing the actual configuration of signal transmission lines in the spike removing blocks.

First of all, the signal waveforms of the four-sample delay circuit 31, the eight-sample delay circuit 32 and the four-sample delay circuit 33 connected along the signal transmission line are explained. The signal waveforms are denoted by notations D0 to D9 in FIG. 11.

The waveforms appearing at elements composing the four-sample time delay 31 are denoted by the notations D0 to D4 in FIG. 12. One scale of the horizontal axis of the figure corresponds to one sample. The symbol "Top" on the vertical axis indicates the upper limit level whereas the symbol "Bottom" denotes the lower limit level. The waveforms appearing at elements composing the four-sample time delay 33 are denoted by the notations D5 to D9 in FIG. 13. The horizontal and vertical axes of FIG. 3 are the same as those of FIG. 12. It should be noted, however, that the waveforms D5 to D9 are waveforms which are obtained by assuming that no data replacement is carried out. A waveform obtained by assuming data replacement has spike noise removed as shown by a waveform OUT in the figure.

The waveforms of elements composing the first to fourth majority decision judgment units 38 to 41 are shown in FIGS. 14 to 17 respectively. In these figures, one scale of the horizontal axis represents one sample. The symbols "H" and "L" on the vertical axis denote the "H" and "L" levels respectively.

Figure 18:
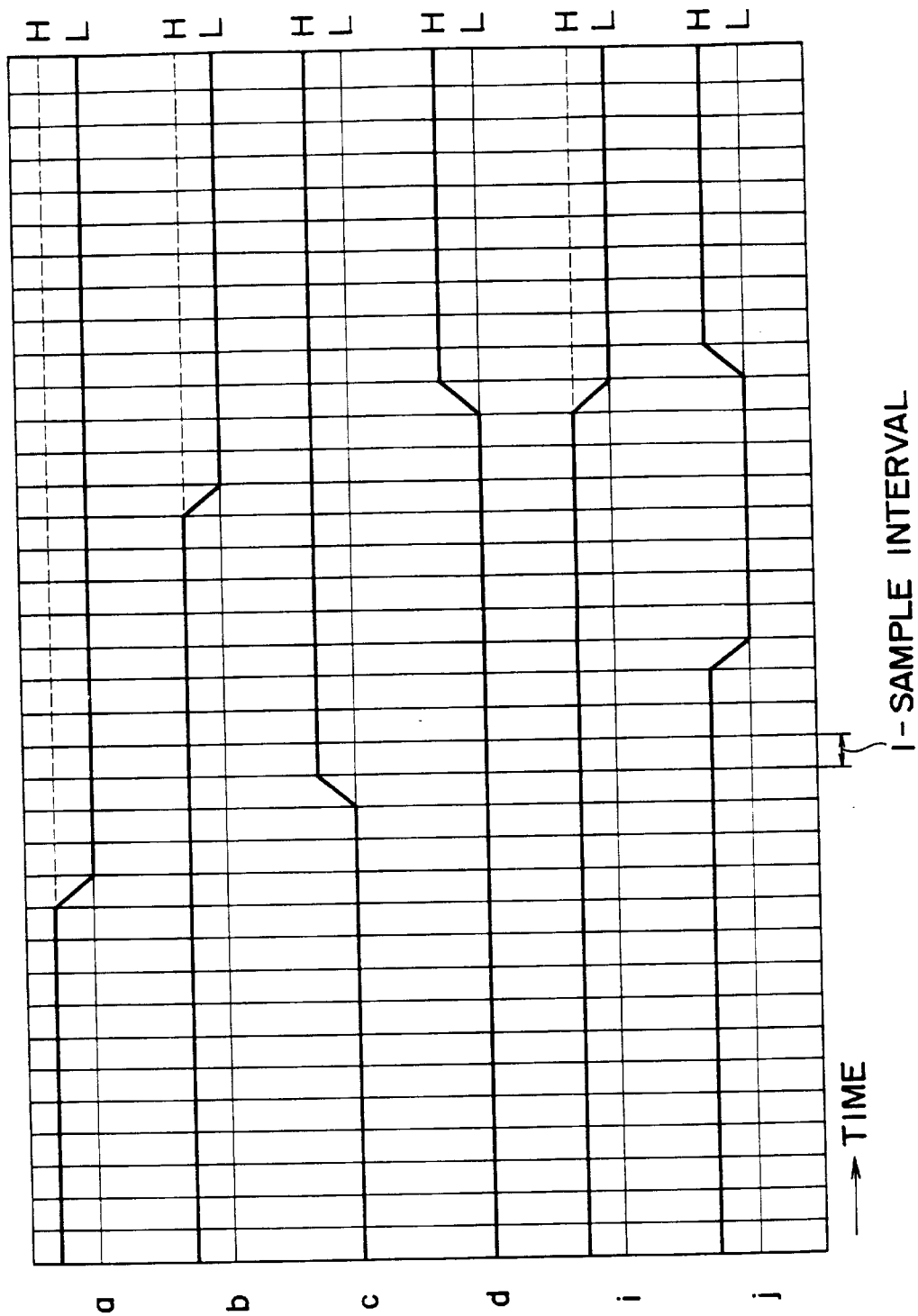
FIG. 18 is a diagram showing signal waveforms appearing at elements composing the switch-control logic circuit.
Figure 19:
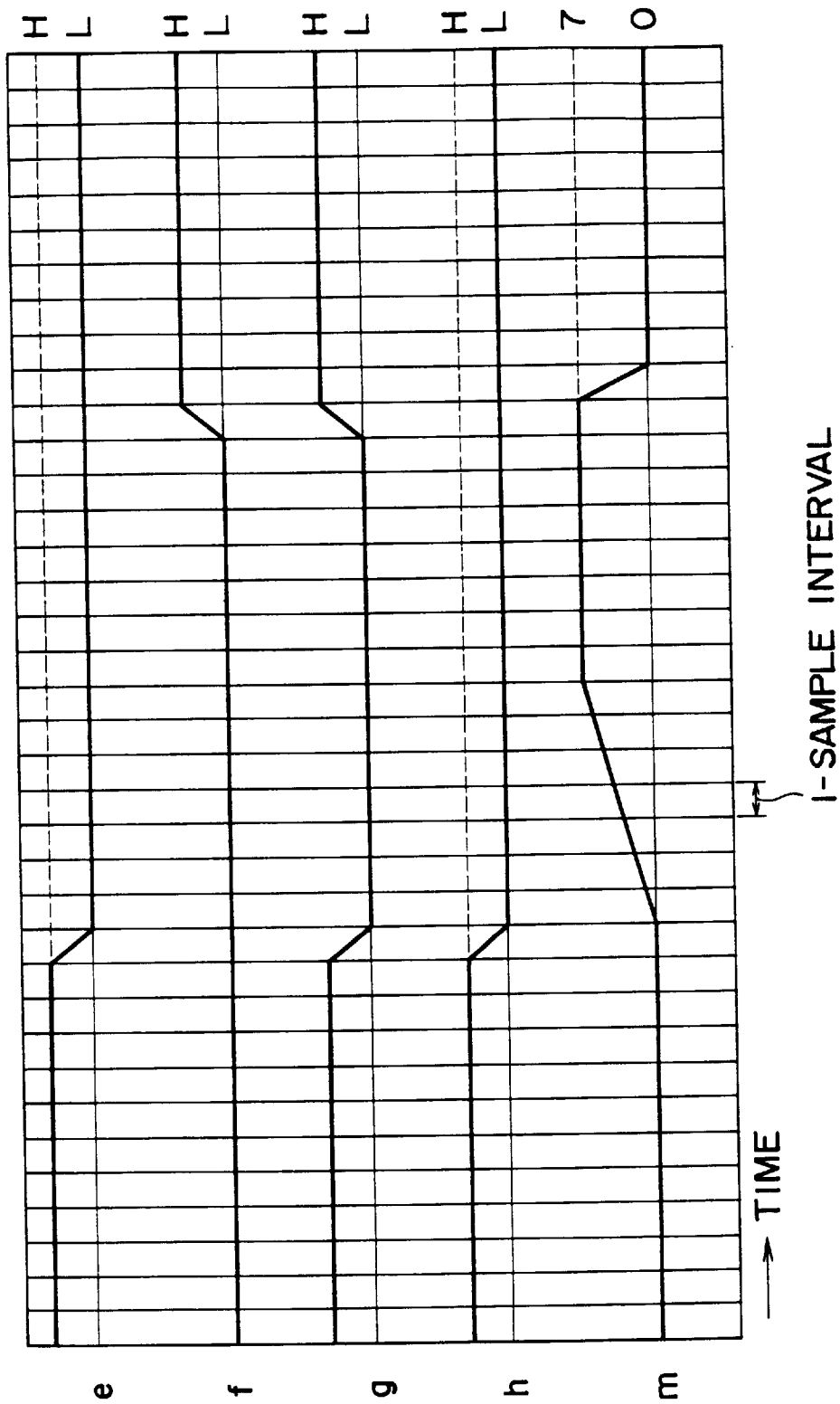
FIG. 19 is a diagram showing signal waveforms appearing at elements composing the switch-control logic circuit and changes in internal variable.

Signal waveforms of components composing the switch-control logic circuit 44 and changes in internal variable m are shown in FIGS. 18 and 19.

It should be noted that, while the present invention has been described with reference to illustrative preferred embodiments, the description is not intended to be construed in a limiting sense. It is further understood by those skilled in the art that a variety of changes and modifications can thus be made to the present invention without departing from the true spirit and scope thereof. For example, the noise suppressing block can be implemented by either only the slice block or the spike removing block. In addition, the spike removing block can have any configuration as far as spike noise is eliminated by means of a logical filter.

As described above in detail, according to the present invention, noise superposed on the horizontal synchronization signal of a video signal can be eliminated.

What is claimed is:

1. A clock signal generating apparatus for generating a clock signal with a phase thereof locked to a phase of a horizontal synchronization signal of a digital video signal, said clock signal generating apparatus comprising:

noise slicing means having level limiter means for setting upper and lower limits in accordance with upper and lower levels of said horizontal synchronization signal for slicing noise superposed on said horizontal synchronization signal of said digital video signal in accordance with the set upper and lower limits;

phase comparing means for comparing a signal output by said noise slicing means with a comparison signal generated internally in order to detect a phase error;

clock signal generating means for generating said clock signal with an oscillation frequency thereof controllable to a variable value in accordance with a signal output by said phase comparing means to represent said phase error; and means for generating said comparison signal by counting the number of pulses of said signal generated by said clock signal generating means.

2. A clock signal generating apparatus for generating a clock signal with a phase thereof locked to a phase of a horizontal synchronization signal of a digital video signal, said clock signal generating apparatus comprising:

a logical filter for removing noise superposed on said horizontal synchronization signal of said digital video signal, said logical filter having upper and lower limit level means for generating upper and lower level signals, control means for selecting one of said upper and lower level signals in accordance with at least one judgment signal, and a number of decision units each having a plurality of delay circuits for receiving sample data of said horizontal synchronization signal and for forming a respective judgment signal therefrom;

phase comparing means for comparing a signal output by said logical filter with a comparison signal generated internally in order to detect a phase error;

clock signal generating means for generating said clock signal with an oscillation frequency thereof controllable to a variable value in accordance with a signal output by said phase comparing means to represent said phase error; and means for generating said comparison signal by counting the number of pulses of said signal generated by said clock signal generating means.

3. A clock signal generating apparatus for generating a clock signal with a phase thereof locked to a phase of a horizontal synchronization signal of a digital video signal, said clock signal generating apparatus comprising:

noise slicing means having level limiter means for setting upper and lower limits in accordance with upper and lower levels of said horizontal synchronization signal for slicing noise superposed on said horizontal synchronization signal of said digital video signal in accordance with the set upper and lower limits;

a logical filter for removing spike noise from a signal output by said noise slicing means;

phase comparing means for comparing a signal output by said logical filter with a comparison signal generated internally in order to detect a phase error;

clock signal generating means for generating said clock signal with an oscillation frequency thereof controllable to a variable value in accordance with a signal output by said phase comparing means to represent said phase error; and means for generating said comparison signal by counting the number of pulses of said signal generated by said clock signal generating means.

4. A method for generating a clock signal with a phase thereof locked to a phase of a horizontal synchronization signal of a digital video signal, said method comprising the steps of:

setting upper and lower limits in accordance with upper and lower levels of said horizontal synchronization signal and slicing noise superposed on said horizontal synchronization signal in accordance with the set upper and lower limits so as to form a sliced signal;

detecting a phase error between said sliced signal and a comparison signal; and controlling the oscillation frequency of said clock signal in accordance with said phase error.

5. A method for generating a clock signal with a phase thereof locked to a phase of a horizontal synchronization signal of a digital video signal, said method comprising the steps of:

removing noise superposed on said horizontal synchronization signal by use of a logical filter so as to form a filtered signal, said logical filter having upper and lower limit level means for generating upper and lower level signals, control means for selecting one of said upper and lower level signals in accordance with at least one judgment signal, and a number of decision units each having a plurality of delay circuits for receiving sample data of said horizontal synchronization signal and for forming a respective judgment signal therefrom;

detecting a phase error between said filtered signal and a comparison signal; and controlling the oscillation frequency of said clock signal in accordance with said phase error.

6. A method for generating a clock signal with a phase thereof locked to a phase of a horizontal synchronization signal of a digital video signal, said method comprising the steps of:

setting upper and lower limits in accordance with upper and lower levels of said horizontal synchronization signal and slicing noise superposed on said horizontal synchronization signal in accordance with the set upper and lower limits and removing noise spikes superposed on said horizontal synchronization signal by use of a logical filter so as to form a noise reduced signal;

detecting a phase error between said noise reduced signal and a comparison signal; and controlling the oscillation frequency of said clock signal in accordance with said phase error.

7. A clock signal generating apparatus according to claim 1, in which the upper and lower levels are pedestal and sync tip levels of said horizontal synchronization signal.

8. A clock signal generating apparatus according to claim 3, in which the upper and lower levels are pedestal and sync tip levels of said horizontal synchronization signal.

9. A method for generating a clock signal according to claim 4, in which the upper and lower levels are pedestal and sync tip levels of said horizontal synchronization signal.

10. A method for generating a clock signal according to claim 6, in which the upper and lower levels are pedestal and sync tip levels of said horizontal synchronization signal.

11. A method for generating a clock signal according to claim 6, in which said logical filter includes upper and lower limit level means for generating upper and lower level signals, control means for selecting one of said upper and lower level signals in accordance with at least one judgment signal, and a number of decision units each having a plurality of delay circuits for receiving sample data of said horizontal synchronization signal and for forming a respective judgment signal therefrom.

* * * * *